United States Patent
Pattabhiraman et al.

(10) Patent No.: US 7,990,900 B2
(45) Date of Patent: Aug. 2, 2011

(54) EVENT NOTIFICATION CONTROL BASED ON DATA ABOUT A USER'S COMMUNICATION DEVICE STORED IN A USER NOTIFICATION PROFILE

(75) Inventors: Ramesh V. Pattabhiraman, New Albany, OH (US); Douglas W. Varney, Naperville, IL (US); Kumar V. Vemuri, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 650 days.

(21) Appl. No.: 11/823,671

(22) Filed: Jun. 28, 2007

(65) Prior Publication Data

US 2009/0003362 A1    Jan. 1, 2009

(51) Int. Cl.
*H04B 7/00* (2006.01)
*H04L 12/28* (2006.01)
*H04L 12/56* (2006.01)
*G06F 15/16* (2006.01)

(52) U.S. Cl. ......... 370/310; 370/389; 709/203; 709/227

(58) Field of Classification Search .................. 370/389, 370/390, 392, 400, 401; 709/203, 224, 227, 709/228, 230, 231, 237
See application file for complete search history.

(56) References Cited

U.S. PATENT DOCUMENTS

| | | | |
|---|---|---|---|
| 6,574,663 B1* | 6/2003 | Bakshi et al. | 709/223 |
| 2002/0085569 A1* | 7/2002 | Inoue | 370/401 |
| 2004/0176076 A1* | 9/2004 | Uppuluri | 455/414.1 |
| 2004/0267939 A1* | 12/2004 | Yumoto et al. | 709/227 |
| 2005/0101306 A1* | 5/2005 | Zabawskyj et al. | 455/414.1 |
| 2006/0075131 A1* | 4/2006 | Douglas et al. | 709/230 |
| 2007/0165653 A1* | 7/2007 | Wiatrak et al. | 370/401 |
| 2007/0214241 A1* | 9/2007 | Song et al. | 709/219 |
| 2008/0034034 A1* | 2/2008 | Agrawal | 709/203 |
| 2009/0100127 A1* | 4/2009 | Dasgupta et al. | 709/203 |

* cited by examiner

*Primary Examiner* — Xavier Szewai Wong
(74) *Attorney, Agent, or Firm* — Carmen Patti Law Group, LLC

(57) ABSTRACT

An exemplary method is implemented in a communication system in which periodically updated data for respective end-users is stored in a notification profile at a communication infrastructure node. The updated data is based on conditions associated with each end-user's communication device and its network context, where the data is not presence status. Predetermined rules are stored at the communication infrastructure node and generate respective results based on factors such as network contextual data and corresponding values contained in the notification profile data for each end-user. An event is detected by the communication infrastructure node where the event is intended to cause communication with all the communication devices that are interested in that event. The communication infrastructure node determines an action to be taken in response to the event based on the results of the rules for data associated with the first end-user. The communication infrastructure node implements the action related to the first end-user.

12 Claims, 5 Drawing Sheets

EVENT NOTIFICATION CONTROL BASED ON DATA ABOUT A USER'S COMMUNICATION DEVICE STORED IN A USER NOTIFICATION PROFILE

BACKGROUND

This invention relates to the control of communications between a network node and end-user communication devices. More specifically it relates to controlling interactions with such devices based on expanded published information about the devices and its network connectivity as part of the notification of presence status information.

Presence services are available for wireline and wireless devices. For example, Internet users have various forms of Instant Messaging (IM) by which the presence status of members of a buddy list can be displayed. Wireless communication devices such as certain cellular telephone services, especially those utilizing push-to-talk technology, may also provide the presence status of members of a buddy list. The end-user communication devices provide presence status information to a central server which maintains an updated list of the presence status of each user. The server notifies any changes to such presence information to entities registered to receive the information (also called watchers).

Maintaining near-real time current presence status information causes an additional overhead loading for the communication network since publication of the presence status is transmitted from the end-user communication devices to the server, and notification of updates are transmitted from the server to subscribed entities. However, many end-users find the availability of presence status information to be valuable and hence service providers must design systems with capabilities to support the service.

Existing communication systems have generally proved successful in providing presence status services. However, as recognized in accordance with the present invention, additional information concerning the communication environment of the end-user communication device could be collected and employed as part of the presence status update transmissions in order to facilitate the improved handling of event notifications to the users. Thus, a need exists for improved status update transmissions with additional information that can be utilized to provide better services to end-users without substantially increasing the overhead burden on the communication infrastructure.

SUMMARY

It is an object of the present invention to satisfy this need.

An exemplary method is implemented in a communication system in which periodically updated data for respective end-users is stored in a notification profile at a communication infrastructure node. The updated data is based on conditions associated with each end-user's communication device, where the data is not presence status. Predetermined rules are stored at the communication infrastructure node and generate respective results based on factors and corresponding values contained in the data for each end-user. An event is detected by the communication infrastructure node where the event is intended to cause a communication with a first end-user's communication device. The communication infrastructure node determines an action to be taken in response to the event based on the results of the rules for data associated with the first end-user. The communication infrastructure node implements the action related to the first end-user.

An exemplary communication node in accordance with the present invention implements the above method.

DESCRIPTION OF THE DRAWINGS

Features of exemplary implementations of the invention will become apparent from the description, the claims, and the accompanying drawings in which:

DETAILED DESCRIPTION

One aspect of the present invention resides in the recognition that improved event notifications to the user can be achieved through additional information concerning the communication environment of the end-user communication device transmitted as part of presence status update transmissions (published information). This additional information can be collected by a presence server and notified to subscribing entities, which may include communication servers, to facilitate better services to the end-user. As used herein "notify" means to transmit information to subscribed entities. For example, additional information such as the current bandwidth available to the end-user communication device could be used to control the size and/or frequency of update transmissions made to the end-user (subscribed entity's) communication device. A relatively large bandwidth available to the end-user device as communicated in the additional information associated with a presence status update published from the end-user device to the presence server could cause larger size packets and/or more frequent updates being transmitted (notified) to the end-user communication device than would have otherwise been made.

Figure 1:
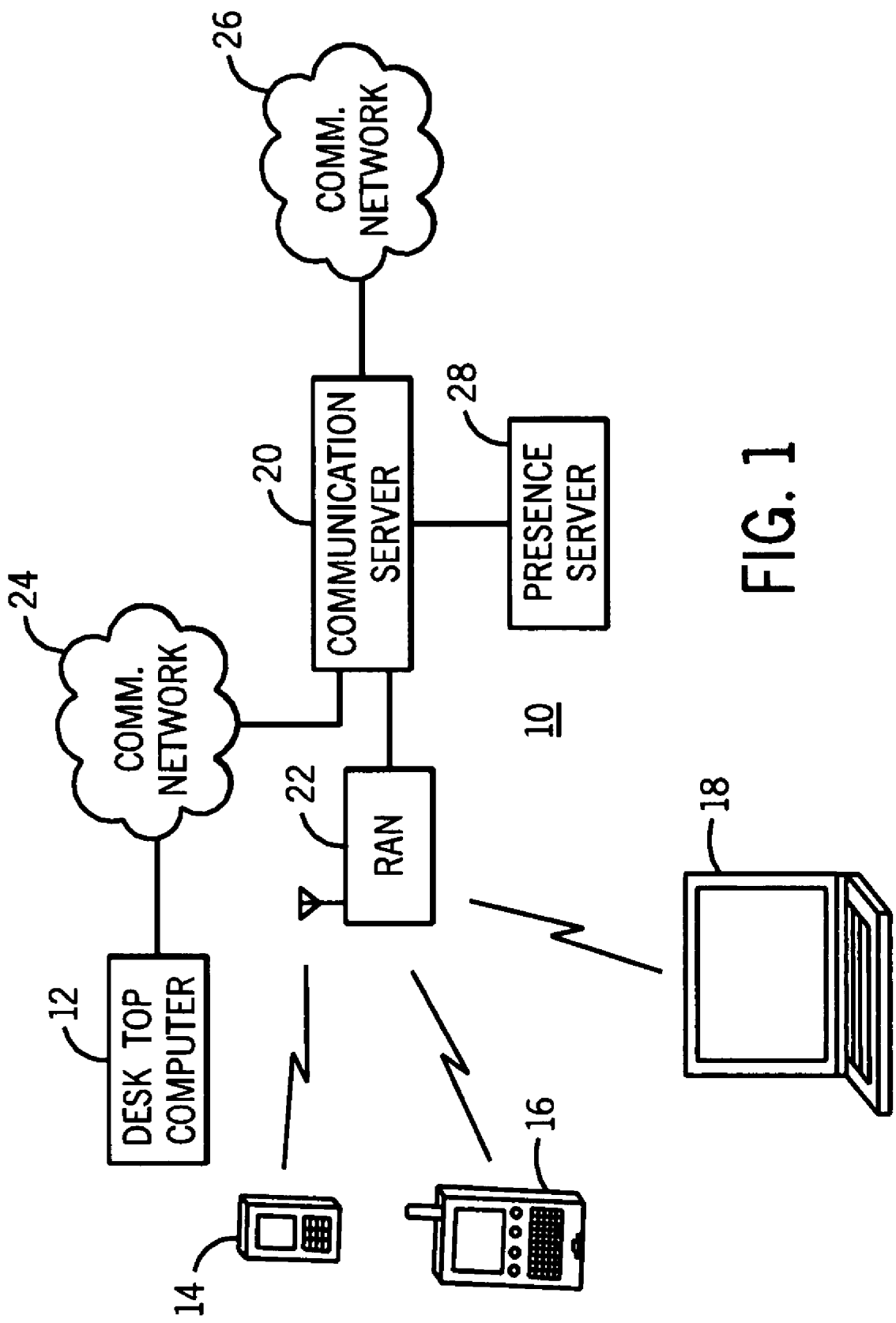
FIG. 1 is a block diagram of a network suited for incorporation of an embodiment of the present invention.

FIG. 1 shows a networking system 10 suited for incorporation of an embodiment of the present invention. A desktop computer 12 is one type of end-user communication device which is connected by wireline. Wireless end-user communication devices such as a cellular telephone 14, personal digital assistant 16 and laptop computer 18 with wireless capabilities are supported by a radio access node (RAN) 22. A communication server 20 supports communications with the end-user devices and is coupled to RAN 22 and to the desktop computer 12 via communication network 24. The communication server 20 is connected to a variety of other communication infrastructure and other end-users by communication network 26. A presence server 28 is coupled to the communication server 20 and supports presence services for the end-users supported by communication server 20.

Presence updates are transmitted (published) in packets from the end-user communication devices to the presence server 28 which parses the presence information and stores the received information for each end-user device. The present server 28 periodically notifies the stored information relating to the respective end-user devices to entities that have subscribed to receive this information. In the illustrative example, communication server 20 is subscribed to receive this information for end-user devices it supports. A more detailed explanation of the utilization of additional presence information is provided below.

Figure 2:
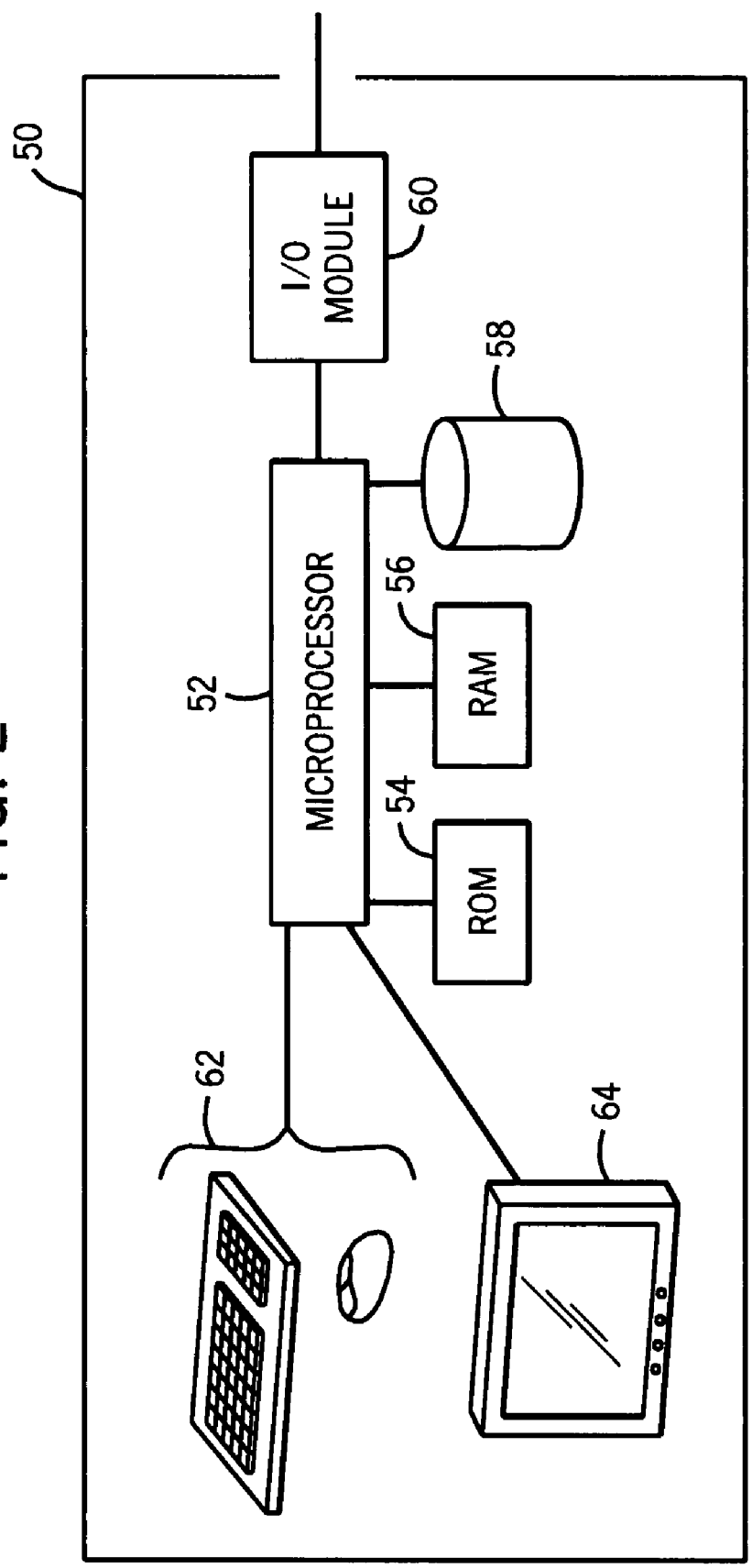
FIG. 2 is a diagram of illustrative nodes as shown in FIG. 1.

FIG. 2 is a block diagram of a node 50 such as used in the network is shown in FIG. 1. The architecture shown for node 50 could be utilized for the communication server 20 and the presence server 28. A microprocessor 52 is supported by read-only memory (ROM) 54, random access memory (RAM) 56, and nonvolatile data storage device 58 which may be a hard drive. An input/output module 60 is coupled to the microprocessor 52 and supports inbound and outbound communications with external devices. Input devices 62 such as a keyboard or mouse permit an administrator to provide data and control inputs to the microprocessor. Output generated by the microprocessor can be displayed to the administrator by an output device 64 such as a monitor. Program instructions initially stored in ROM 54 and storage device 58 are typically transferred into RAM 56 to facilitate run-time operation of the application implemented by microprocessor 52.

The communication server and the presence server each have a different responsibility. The primary application implemented by the communication server involves setting up and handling bi-directional communications in support of communications between the communication devices of end-users. Those skilled in the art will appreciate that the communication server also supports related functions including overhead and background activities associated with end-user communications and end-user devices. The primary application associated with the presence server involves maintaining and storing updated presence information for the respective users, and publishing this information to subscribed entities. In accordance with an embodiment of the present invention, the presence server parses and manages additional information associated with the conventional presence information. A detailed explanation of the operation of the presence server with regard to this additional information is provided below. It will be apparent to those skilled in the art that the stored program instructions in the nodes will support the respective application programs which include the implementation of the illustrative steps of an embodiment of the method in accordance with the present invention as described below.

Figure 3:
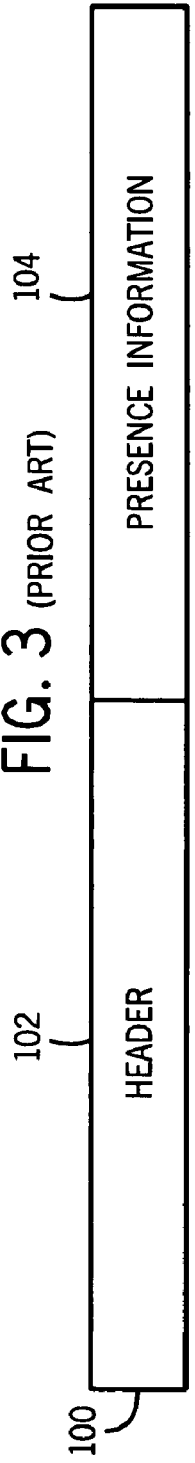
FIG. 3 shows an illustrative packet of the transmission of presence information as accomplished in the prior art.

FIG. 3 shows an exemplary packet 100 in accordance with the prior art. It contains a header 102 and presence information 104. The header includes destination and origination addresses as well as other overhead parameters associated with the particular communication system. The presence information 104 contains the conventional presence status types of the end-user communication device, e.g. available, busy, in conversation with another, etc. An end-user communication device will periodically transmit (or pull on demand) such a packet 100 to a status server in order to maintain an up-to-date presence status for the respective user.

Figure 4:
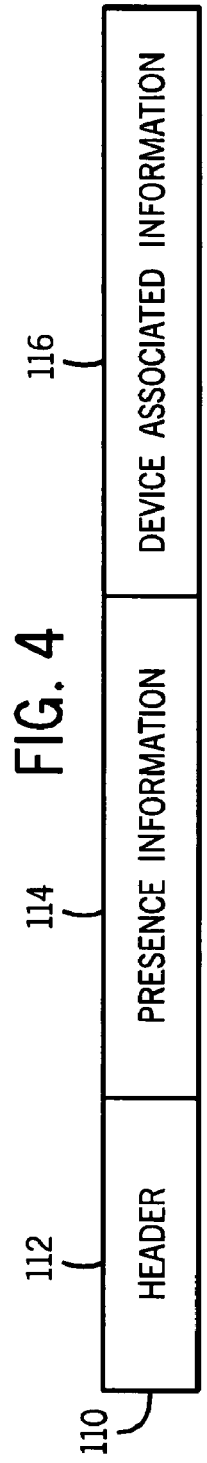
FIG. 4 shows an illustrative packet of the transmission of presence information that includes expanded additional information in accordance with the present invention.

FIG. 4 shows an exemplary packet 110 in accordance with an embodiment of the present invention. It contains a header 112, presence information 114 and device associated information 116. The header 112 and the presence information 114 are substantially similar to the header 102 and presence information 104. The device associated information 116 is attached to and transmitted as part of the packet 110 associated with an update on the presence status of the respective user. In accordance with the embodiment of the present invention, the device associated information 116 may contain various types of information associated with the end-user communication device and/or its communication environment. For example, information 116 could identify the type of factor and a corresponding value, e.g. bandwidth: 7; battery: 5; access network type; device type. Packet 110 will be periodically transmitted from the end-user communication device by the communication server 20 to the presence server 28. The information 116 is carried in a "piggyback" arrangement, i.e. it tags along with the presence packet and is only updated when a normal presence update would occur. When received by the presence server 28, packet 110 is parsed so that the presence information 114 is utilized provide an update of the presence status of the respective user, while the information 116 is separately stored and defines other information concerning the end-user communication device or its communication environment other than presence status.

Figure 5:
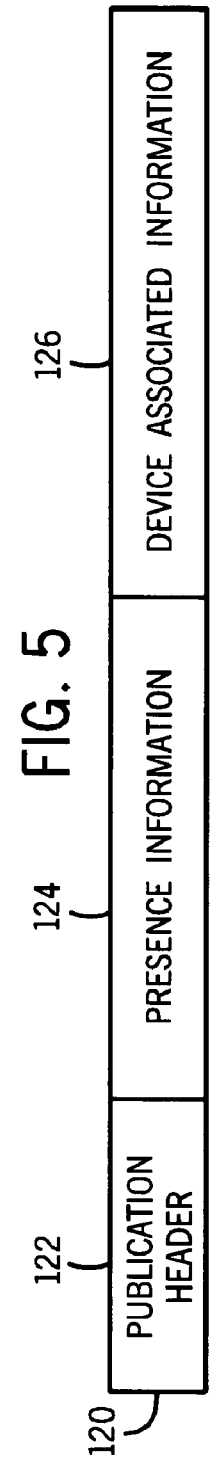
FIG. 5 shows an illustrative packet of the publication of presence information that includes expanded additional information in accordance with the present invention.

FIG. 5 shows the exemplary packet 120 in accordance with an embodiment of present invention. It contains a publication header 122, presence information 124, and device associated information 126. This packet is transmitted from the presence server 28 and is based on information previously received from end-user communication devices transmitted by packets 110. The publication header 122 may specify one or a plurality of devices that have subscribed to receive presence information for a specified end-user. The presence information 124 will contain the most recent presence status as stored at the presence server 28 for the respective end-user device. The device associated information 126 will contain the current additional information. More than one type of information may be contained in it. For example, each different type of information may be grouped with a corresponding predetermined label, e.g. "bandwidth: xx; battery: yy" where xx represents a value associated with an amount of bandwidth available to the end-user device and yy represents a value associated with the degree of charge of battery supporting the end-user device.

Figure 6:
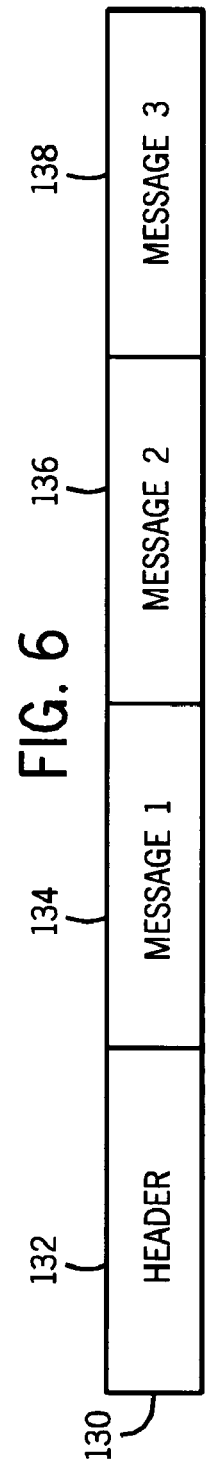
FIG. 6 shows an illustrative packet containing messages that have been appended in one packet based on previously received presence information about the subject communication device in accordance with the present invention.

FIG. 6 shows an exemplary packet 130 in accordance with an embodiment of the present invention. It contains a header 132, a first message 134, a second message 136, and a third message 138. This packet may be transmitted from the communication server 20 to a respective end-user communication device identified by the header 132. In this embodiment, communication server 20 is subscribed to and receives packets 120 for a corresponding end-user. The communication server makes use of the additional information contained in information 126 relating to the subject end-user device, which in this example contains at least an indication of bandwidth. For example, assume that the subject end-user device is identified by information 126 as being connected by high bandwidth service. The communication server 20 can utilize this information to make decisions concerning the size and frequency of packets be sent to the subject end-user device. In this example, three events, i.e. messages 134, 136 and 138, are carried in a single packet 130 to the subject end-user device since it is known to the communication server that the end-user device is supported by high bandwidth service and that the amount of data required to send the three messages will not unduly burden communication facilities associated with the subject end-user.

Figure 7:
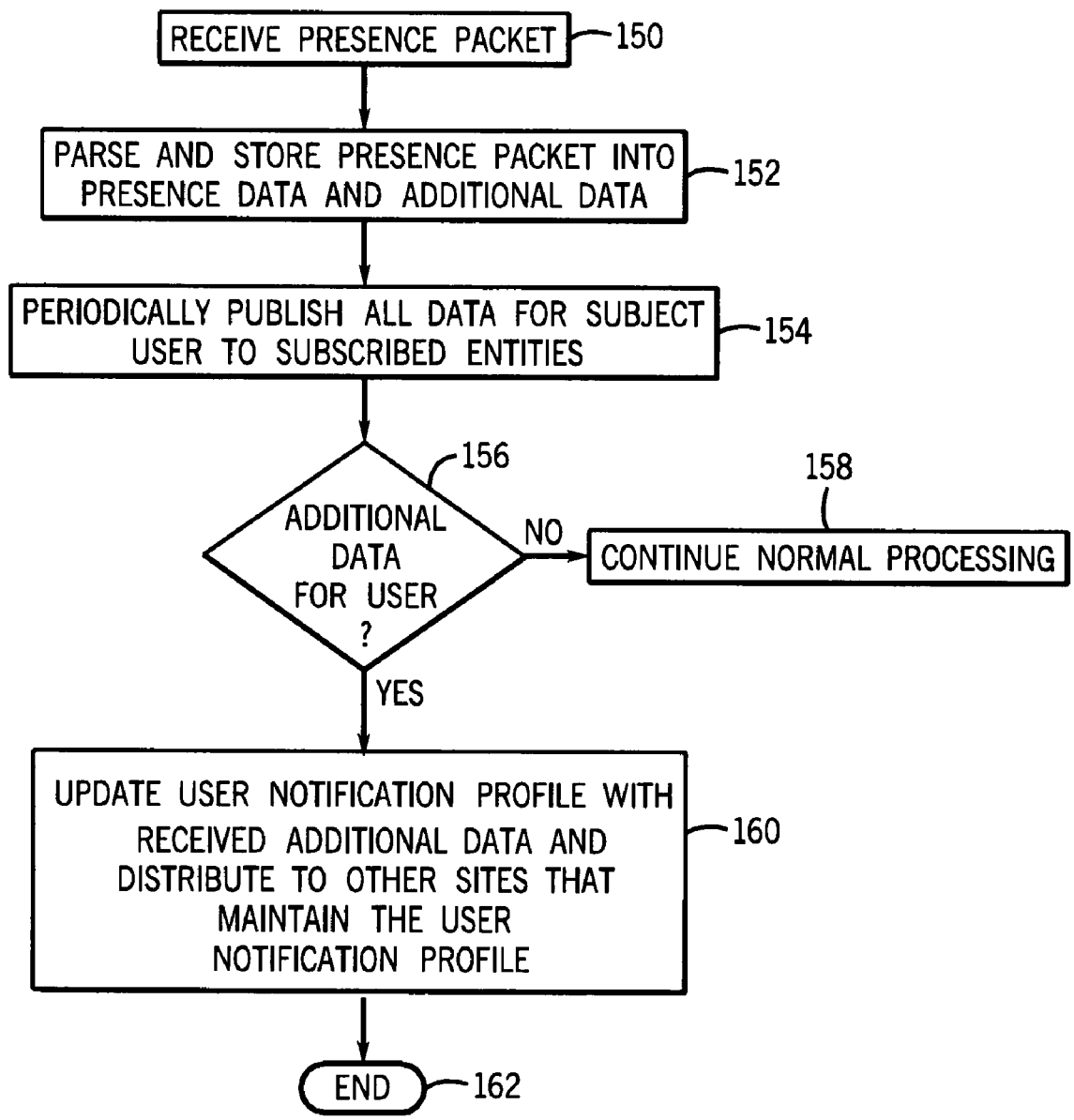
FIG. 7 is a flow diagram of illustrative steps for receiving and storing additional data contained in a user's presence packet in accordance with an embodiment of a method of the present invention.

FIG. 7 shows illustrative steps for receiving and storing additional data contained in a user's presence packet. In step 150 a presence packet from a user's communication device is received at the presence server 28. The presence server parses and stores the presence packet into presence data and additional data as indicated by step 152. For example, a separate record for each user may be stored in a database containing the presence data and additional data. In step 154 the presence server periodically notifies all data for a subject user to all subscribed entities. The subscribed entities may include other users in which the subject user is on their buddy list and the communication server 20. In step 156 a determination is made of whether additional data is present for the subject user. A NO determination by step 156 results in the continuation of normal processing as indicated in step 158. A YES determination by step 156, indicating that additional data is present for the subject user, results in step 160 causing an update of the user notification profile with the received additional data. Although a user notification profile could be maintained by other users, the illustrative example assumes that the communication server makes the decision associated with step 156 and stores the notification profile. Processing terminates at END 162. In accordance with the process explained with regard to FIG. 7, a user notification profile is updated with periodic additional data information contained in presence packets received from the user. A user notification profile may consist of a separate record for each user, where each record contains one or more values associated with factors that may be utilized control how the user will be notified of upcoming events.

Figure 8:
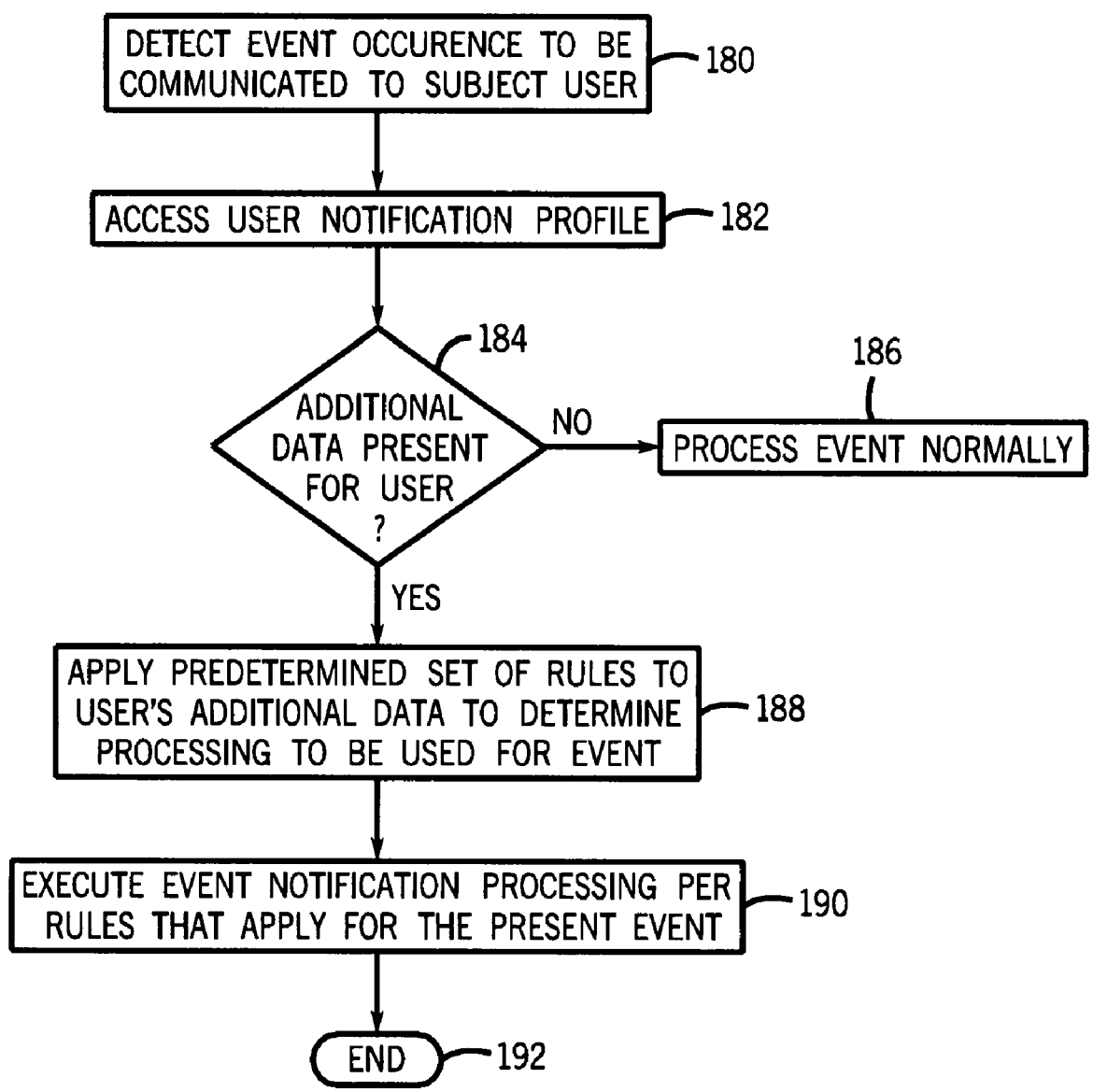
FIG. 8 is a flow diagram of illustrative steps for event processing by an infrastructure node based on additional data contained in a user notification profile in accordance with an embodiment of a method of the present invention.

FIG. 8 shows illustrative steps for event processing by the communication server based on additional data contained in a user notification profile. In step 180 the communication server detects the occurrence of an event to be communicated to a subject user. In step 182 the communication server accesses a corresponding user notification profile. In step 184 a determination is made by the communication server of whether additional data is present for the subject user. A NO determination by step 184 results in the communication server processing the communication of the event to the user in a normal process. A YES determination by step 184, indicating that additional information exists in the corresponding user notification profile, results in the application of a predetermined set of rules to the user's additional data to determine processing to be used for notification of the event in step 188. The predetermined set of rules may be stored as part of each user record in the notification profile or may consist of a general set of rules to be applied to each of the user records. It will be noted that the events and the set of rules are not restricted to operation on only presence related events. For example, if additional data for a subject user indicates that the user's communication device is operating at high bandwidth, the communication server can utilize this information to more effectively manage the transmission of communications to the user. For example, each of the three messages 134, 136 and 138 may have been received as separate events, but all are intended for the same subject user. Because the user's communication device is capable of high bandwidth communications as indicated by the additional data, the three separate messages may be combined into a larger sized packet 130 than would normally be utilized in view of the high bandwidth available to the user's communication device. In step 190 the communication server executes processing of the event in accordance with the user's notification profile and the rules that apply to the corresponding additional data. The process terminates at END 192.

Different values representing different conditions of a factor can be utilized in various ways to control the way that a user is notified of various events. As used therein, an "event" means any type of information or command that is to be communicated to a user's communication device. As explained, a set of messages can be batched together for transmission to the user to take advantage of high bandwidth communications available to the user's communication device. It may also be advantageous to batch certain messages together, such as where messages are awaiting delivery to a user and a further communication such as a page is concurrently received for the same user. In addition to transmitting the page to the user, the messages can also be appended to the same communication assuming that the user's notification profile is supportive of such processing, i.e. where the user's bandwidth is sufficient to receive the total batched message within an acceptable delay constraint.

The amount of battery charge available to the user's communication device may also be utilized in a user's notification profile to control the communication of events to the user. For example, assume that a communication device is operating at a very minimal battery charge and that this information is reflected in the user's notification profile. Certain non-critical events and/or communications that would have normally been transmitted to this user's communication device can be "throttled" (reduced in magnitude or sent less frequently) in order to minimize the battery drain at the user's communication device. In fact, certain routine non-critical events may be canceled by the rules operating on the data contained in the notification profile of the user.

A variety of factors may be useful to be monitored in connection with controlling the communication of events in accordance with values stored for such factors in a user's notification profile. In addition to the factors already mentioned, the status of a user being within a home or visiting network, the amount of free memory contained in the user's device, the ability of the user's device to receive certain communication protocols, the amount characters or number of pixels that can be simultaneously displayed on the user's screen, etc. may be used in a notification profile to advantageously control how and when different events should be communicated to the user based on such factors.

The example above indicates how the published device- and connection-level information might be utilized to support presence notifications tailored to the characteristics of particular end devices. Similar processing could also be done to support usage scenarios for other services where applications utilize the devices' published profile information to determine how best to interact with a device to provide the best possible end-user experience.

Although exemplary implementations of the invention have been depicted and described in detail herein, it will be apparent to those skilled in the art that various modifications, additions, substitutions, and the like can be made without departing from the spirit of the invention. With regard to the illustrative steps of an embodiment of a method of the present invention, other steps can be substituted, steps deleted, and/or the steps could be practiced in a different order or by a different apparatus. A user's notification profile could be stored and maintained at various nodes in the communication infrastructure if desired, including combining its function with other functions supported by the node.

The scope of the invention is defined in the following claims.

We claim:

1. A method implemented in a communication system in which end-users' wireless communication devices are provided with periodically updated presence status information for other end-users, the method comprising the steps of:

receiving a presence packet wirelessly-transmitted from an end-user's wireless communication device where the packet contains both presence status information and data that represents conditions or attributes associated with the end-user's communication device, the presence status information representing the current capability of the end-user's device itself to support a voice call from another user;

storing, in a notification profile at a communication infrastructure node, periodically updated presence status information and data for respective end-users, the updated data representing conditions associated with each end-user's communication device;

storing at the communication infrastructure node predetermined rules that govern the establishment of a call in response to a call origination request directed to a destination end-user's device based at least in part on values contained in the respective stored data for the destination end-user's device;

detecting a call origination request to a first end-user's device by the communication infrastructure node;

determining by the communication infrastructure node whether a call with the first end-user's device is to be established in response to the call request based on the results of the rules and the data associated with the first end-user;

periodically transmitting by a presence server a publication packet to a group of end-user's wireless communication devices registered to receive presence status information updates for the first end-user, the publication packet containing a header with addresses of members of the group, presence status information, and data associated with the first end-user's wireless communication device.

2. The method of claim 1 wherein a single presence packet contains both presence status information and data associated with the end-user's device from which it was transmitted.

3. The method of claim 2 further comprising the steps of receiving the presence packet by a presence server, parsing the packet by the presence server to separate the presence status information and data, and transmitting the updated data contained in the packet to the communication infrastructure node for storage in a record in the notification profile associated with the corresponding end-user's communication device.

4. The method of claim 1 wherein the data is received only when a presence packet is received by a presence server upon a transmission of a presence status information update when determined by the end-user's device.

5. The method of claim 1 wherein the conditions comprise communication bandwidth available to the end-user's communication device.

6. The method of claim 1 wherein the conditions comprise the state of charge of a battery of the end-user's communication device.

7. A communication server that provides end-users' wireless communication devices with periodically updated presence status information for other end-users, the server comprising:

a microprocessor controlled apparatus that stores in a notification profile periodically received presence status information and data contained in a presence packet wirelessly-transmitted from an end-user's wireless communication device, where the data that represents conditions or attributes associated with the end-user's communication device, the presence status information representing the current capability of the end-user's device itself to support a voice call from another user;

the microprocessor controlled apparatus also stores predetermined rules that govern the establishment of a call in response to a call origination request directed to a destination end-user's device based at least in part on values contained in the respective stored data for the destination end-user's device;

the microprocessor controlled apparatus detects a call origination request to a first end-user's device;

the microprocessor controlled apparatus determines whether a call with the first end-user's device is to be established in response to the call request based on the results of the rules and the data associated with the first end-user;

the microprocessor controlled apparatus periodically transmitting a publication packet to a group of end-user's wireless communication devices registered to receive presence status information updates for the first end-user, the publication packet containing a header with addresses of members of the group, presence status information, and data associated with the first end-user's wireless communication device.

8. The communication server of claim 7 wherein a single presence packet contains both presence status information and data associated with the end-user's device from which it was transmitted.

9. The communication server of claim 7 wherein the data is received only when a presence packet is received upon a transmission of a presence status information update when determined by the end-user's device.

10. A communication server that provides end-users' wireless communication devices with periodically updated presence status information for other end-users, the server comprising:

a microprocessor controlled apparatus that stores in a notification profile periodically received presence status information and data contained in a presence packet wirelessly-transmitted from an end-user's wireless communication device, where the data that represents conditions or attributes associated with the end-user's communication device, the presence status information representing the current availability of the end-user's device itself to accept a voice call from another user;

the microprocessor controlled apparatus also stores predetermined rules that govern the establishment of a call in response to a call origination request directed to a destination end-user's device based at least in part on values contained in the respective stored data for the destination end-user's device;

the microprocessor controlled apparatus detects a call origination request to a first end-user's device;

the microprocessor controlled apparatus determines whether a call with the first end-user's device is to be established in response to the call request based on the results of the rules and the data associated with the first end-user;

the microprocessor controlled apparatus causing the periodic transmission of publication packets to a group of end-user's wireless communication devices registered to receive presence status information updates for the first end-user, the publication packet containing a header with addresses of members of the group, presence status information, and data associated with the first end-user's wireless communication device.

11. The communication server of claim 10 wherein the conditions comprise communication bandwidth available to the end-user's communication device.

12. The communication server of claim 10 wherein the conditions comprise the state of charge of a battery of the end-user's communication device.

* * * * *